United States Patent
Yoshida et al.

(10) Patent No.: US 7,560,180 B2
(45) Date of Patent: Jul. 14, 2009

(54) GAS DIFFUSION LAYER AND FUEL CELL USING THE SAME

(75) Inventors: Akihiko Yoshida, Hirakata (JP); Masaki Yamauchi, Neyagawa (JP); Yoshihiro Hori, Ikoma (JP); Makoto Uchida, Hirakata (JP)

(73) Assignee: Panasonic Corporation, Osaka (JP)

( * ) Notice: Subject to any disclaimer, the term of this patent is extended or adjusted under 35 U.S.C. 154(b) by 880 days.

(21) Appl. No.: 11/062,749

(22) Filed: Feb. 23, 2005

(65) Prior Publication Data

US 2005/0214630 A1    Sep. 29, 2005

(30) Foreign Application Priority Data

Feb. 23, 2004    (JP)    ............... 2004-046521

(51) Int. Cl.
*H01M 8/00*    (2006.01)
*H01M 4/00*    (2006.01)

(52) U.S. Cl. .......................... 429/12; 429/40
(58) Field of Classification Search ............ 429/12, 429/40
See application file for complete search history.

(56) References Cited

U.S. PATENT DOCUMENTS

2004/0157112 A1*    8/2004    Suzuki et al. ............ 429/44

FOREIGN PATENT DOCUMENTS

| EP | 1 139 471 A1 | 10/2001 |
|---|---|---|
| JP | 03-167752 | 7/1991 |
| JP | 7-134993 | 5/1995 |
| JP | 2001-283869 | 10/2001 |
| JP | 2002-184412 | 6/2002 |
| JP | 2002-352807 | 12/2002 |
| JP | 2003-36860 | 2/2003 |
| JP | 2003-331850 | 11/2003 |
| JP | 2004-235134 | 8/2004 |
| WO | WO 01/22509 A1 | 3/2001 |

OTHER PUBLICATIONS

International Search Report issued in International Application No. PCT/2005/002691, mailed Jun. 7, 2005.

* cited by examiner

*Primary Examiner*—Patrick Ryan
*Assistant Examiner*—Helen O Chu
(74) *Attorney, Agent, or Firm*—McDermott Will & Emery LLP (57) ABSTRACT

To provide a gas diffusion layer excellent in micro short-circuit resistance and anti-flooding characteristics by optimizing the surface shape of a gas diffusion layer.

In a gas diffusion layer for a gas diffusion electrode including at least a catalyst layer containing an electrode catalyst and a gas diffusion layer having electron conductivity and gas diffusibility, a second surface of the gas diffusion layer, which is positioned opposite to a first surface thereof to be in contact with the catalyst layer, is made rougher than the first surface. The first surface has a maximum height $Ry_1$ of 10 to 50 determined by JIS B 0601 surface roughness measurement method, and the second surface has a maximum height $Ry_2$ of 100 to 500 determined by JIS B 0601 surface roughness measurement method.

12 Claims, 4 Drawing Sheets

GAS DIFFUSION LAYER AND FUEL CELL USING THE SAME

BACKGROUND OF THE INVENTION

The present invention relates to a gas diffusion layer for a gas diffusion electrode. More specifically, the invention relates to a gas diffusion layer used for a gas diffusion electrode for a fuel gas. The present invention relates to a fuel cell including a gas diffusion electrode using the aforesaid gas diffusion layer.

Conventional polymer electrolyte fuel cells employing a cation (hydrogen ion) conductive polymer electrolyte generate electricity and heat by electrochemically reacting a fuel gas containing hydrogen and an oxidant gas containing oxygen such as air.

Figure 5:
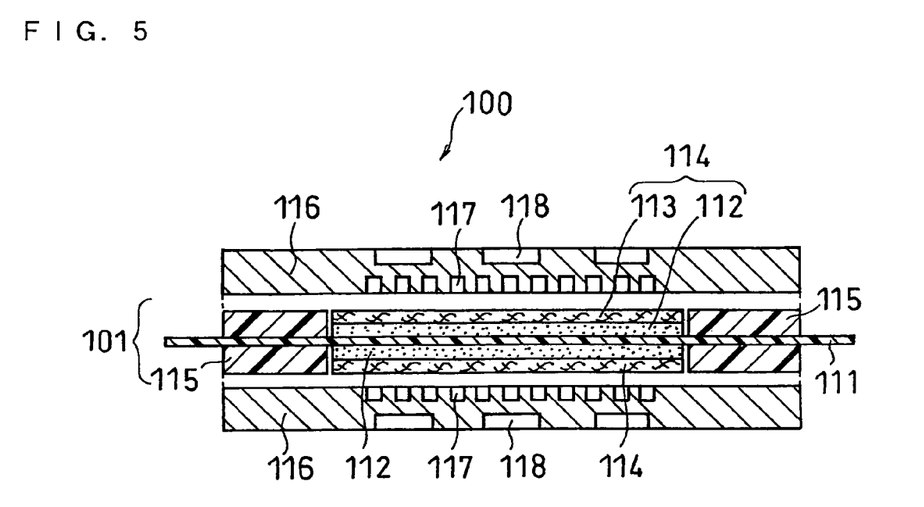
FIG. 5 is a schematic cross sectional view illustrating a basic structure of a unit cell designed to be mounted in a conventional polymer electrolyte fuel cell.
Figure 6:
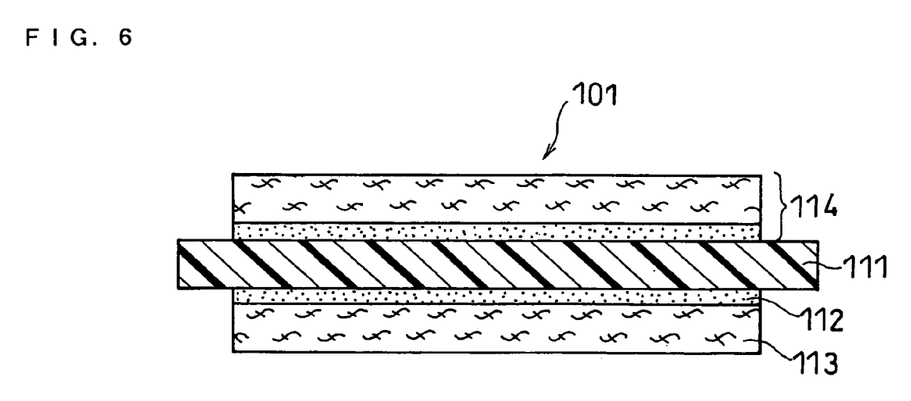
FIG. 6 is a schematic cross sectional view illustrating a basic structure of a membrane-electrode assembly designed to be mounted in the unit cell 100 shown in FIG. 5.

FIG. 5 is a schematic cross sectional view illustrating a basic structure of a unit cell designed to be mounted in a conventional polymer electrolyte fuel cell. FIG. 6 is a schematic cross sectional view illustrating a basic structure of a membrane-electrode assembly designed to be mounted in the unit cell 100 shown in FIG. 5. As shown in FIG. 6, in a membrane-electrode assembly 101, on each surface of a polymer electrolyte membrane 111 capable of selectively transporting hydrogen ions is formed a catalyst layer 112 composed of a hydrogen ion conductive polymer electrolyte and a catalyst body obtained by allowing carbon powders to carry an electrode catalyst (e.g. platinum metal catalyst).

As the polymer electrolyte membrane 111, polymer electrolyte membranes made of perfluorocarbonsulfonic acid such as Nafion (trade name) available from E.I. Du Pont de Nemours & Co. Inc., USA are now widely used.

On the outer surface of each catalyst layer 112 is formed a gas diffusion layer 113 having gas permeability and electron conductivity by using carbon paper, which has been subjected to water repellent treatment, for example. The combination of the catalyst layer 112 and the gas diffusion layer 113 constitutes a gas diffusion electrode 114 (anode or cathode).

A conventional unit cell 100 is composed of a membrane-electrode assembly 101, gaskets 115 and a pair of separators 116. The gaskets 115 are arranged on the outer periphery of the electrodes with the polymer electrolyte membrane 111 sandwiched therebetween so as to prevent the supplied fuel gas and the supplied oxidant gas from leaking out and to prevent them from mixing with each other. The gaskets 115 are usually integrated in advance with the electrodes and the polymer electrolyte membrane 111. In some cases, the combination of the electrodes and the polymer electrolyte membrane 111 and gaskets 115 is called "membrane-electrode assembly".

On the outer surfaces of the membrane-electrode assembly 101 are placed a pair of separators 116 for mechanically fixing the membrane-electrode assembly 101. On the surface of the separator 116 in contact with the membrane-electrode assembly 101 is formed gas channels 117 for supplying a reaction gas (fuel gas or oxidant gas) to the gas diffusion electrode 114 and removing a gas containing an electrode reaction product and unreacted reaction gas from the reaction site to the outside of the electrodes.

Although the gas channels 117 may be formed independently of the separator 116, they are usually formed by providing grooves on the surface of the separator as shown in FIG. 5.

A single unit cell 100 constructed by fixing the membrane-electrode assembly 101 with a pair of separators 116 can produce an electromotive force of about 0.7 to 0.8 V at a practical current density of several tens to several hundreds mA/cm$^2$ when a fuel gas is supplied to the gas channel 117 of one of the separators 116 and an oxidant gas is supplied to the gas channel 117 of the other of the separators 116.

Polymer electrolyte fuel cells, however, are usually required to produce a voltage of several to several hundreds volts when used as power sources. For this reason, in practice, the required number of unit cells are connected in series to give a stack for use.

In order to supply a reaction gas to the gas channel 117, there is required a manifold in which a pipe for supplying the reaction gas is branched into a corresponding number of separators 116 and the branched pipes are directly connected to the gas channels on the separators 116. Particularly, a manifold in which external pipes for supplying the reaction gas are directly connected to the separators 116 is called "external manifold".

On the other hand, there is another type of manifold called "internal manifold", which has a simpler structure. An internal manifold is composed of apertures formed in the separators 116 having gas channels 117 formed thereon. The inlet and outlet of the gas channel 117 are connected with the apertures. The reaction gas can be supplied to the gas channel 117 directly from the aperture.

The gas diffusion layer (GDL) 113 is also called as "GDM" (gas diffusion media) or "backing layer". It serves to supply chemical substances as the energy source for power generation to the catalyst layer 112 uniformly without any loss during transportation, and to remove the generated electric energy to an external circuit. For this reason, the gas diffusion layer 113 is required to have high gas permeability for reaction gas such as fuel gas or oxidant gas, high water drainage capability and high electron conductivity.

In order to impart the gas permeability, the gas diffusion layer 113 has a porous structure, whereby a reaction gas can be supplied and diffused uniformly to the catalyst in the catalyst layer 112 from the gas channel 117 arranged such that it is in contact with the gas diffusion layer 113.

In order to impart water drainage capability to the gas diffusion layer 113 so as to facilitate the removal of water produced by the reaction in the catalyst layer 112, a water repellent polymer as typified by fluorocarbon resin or the like is dispersed in the pores of the gas diffusion layer 113. Imparting water repellency to the gas diffusion layer 113 like this prevents the clogging of water (flooding) in the gas diffusion layer 113.

Further, the gas diffusion layer 113 is also required to have a function to conduct electrons necessary for the reaction and generated electrons. In order to acquire such electron conductivity, the gas diffusion layer 113 is formed using an electron conductive material such as carbon fiber, metal fiber or carbon fine powders.

A conventional gas diffusion layer 113 like the one as described above is typically produced by first coating a porous electron conductive material such as carbon paper or carbon cloth serving as the substrate for the gas diffusion layer 113 with a water repellent resin such as fluorocarbon resin, and then forming a water repellent conductive layer (water repellent carbon layer)(not shown in the drawings) containing carbon and a water repellent polymer on one surface of the coated substrate, that is, the surface to be in contact with the catalyst layer 112.

Although the gas diffusion layer 113 is usually produced in the above-described manner, in order to cope with the recent trend of providing higher output, prolonging service life and reducing cost, various attempts have been made on the development of production methods therefor and the shape of the finished products.

For example, in an attempt to enhance water drainage capability by the gas diffusion layer 113, Japanese Laid-Open Patent Publication No. 2001-283869 proposes to form a water repellent carbon layer having asperities, on the surface of the gas diffusion layer 113 to be in contact with the catalyst layer 112, so as to increase the evaporation area where the water produced by power generation can evaporate.

In Japanese Patent Publication No. 2831061, in an attempt to achieve a high output and cost reduction by increasing the contact area between the catalyst in the catalyst layer 112 and the electrolyte in the polymer electrolyte membrane 111 to significantly improve the utilization of the catalyst, there is proposed to form asperities on the surface of the catalyst layer 112 to be in contact with the polymer electrolyte membrane 111.

BRIEF SUMMARY OF THE INVENTION

There have been attempts to improve the cell performance by making the surface of the gas diffusion layer 113 or the catalyst layer 112 as described above to have asperities, but they are accompanied by disadvantages.

Specifically, although the formation of asperities as described above is effective from the viewpoint of improving anti-flooding characteristics, the function to insulate the gas diffusion electrodes 114 from each other will be impaired if there exists an acute protrusion that might pierce the polymer electrolyte membrane 111. Moreover, even when the asperities are obtuse, they might cause damage to the polymer electrolyte membrane 111.

The asperities on the surface of the gas diffusion layer 113 or the catalyst layer 112 impose stress to the polymer electrolyte membrane 1ll. As a result, although it does not affect the power generation of the fuel cell at the initial stage, problems occur during its continuous operation such as damaging the polymer electrolyte membrane 111 to reduce cell performance and piercing the polymer electrolyte membrane 111 to cause a micro short-circuit between the gas diffusion electrodes 114, hampering the power generation.

In view of the above problems, an object of the present invention is to provide a gas diffusion layer for a gas diffusion electrode that can be used to easily realize a fuel cell without fail which exhibits excellent anti-flooding characteristics, can protect the polymer electrolyte membrane from damage and can prevent the degradation of cell performance. Another object of the present invention is to provide a fuel cell which exhibits excellent anti-flooding characteristics, can protect the polymer electrolyte membrane from damage and can prevent the degradation of cell performance by using the aforesaid gas diffusion layer.

In order to overcome the above problems, the present invention provides a gas diffusion layer for a gas diffusion electrode comprising: at least a catalyst layer containing an electrode catalyst; and a gas diffusion layer having electron conductivity and gas diffusibility, wherein a second surface of the gas diffusion layer which is positioned opposite to a first surface of the gas diffusion layer is made rougher than the first surface, the first surface being in contact with the catalyst layer, the first surface has a maximum height $Ry_1$ of 10 to 50 determined by JIS B 0601 surface roughness measurement method, and the second surface has a maximum height $Ry_2$ of 100 to 500 determined by JIS B 0601 surface roughness measurement method.

The gas diffusion layer of the present invention can comprise a porous conductive substrate and a water repellent conductive layer formed on one surface of the porous conductive substrate. In this case, the first surface which is smooth corresponds to the surface of the water repellent conductive layer, and the second surface which is rough corresponds to the surface of the porous conductive substrate.

The surface roughness determined by JIS B 0601 surface roughness measurement method is the same as the surface roughness determined by ISO 4287 surface roughness measurement method.

The smaller the maximum height ($Ry_1$) of the first surface means the smoother the first surface. In the present invention, the $Ry_1$ is made to be 10 to 50. When the first surface has a $Ry_1$ of exceeding 50, asperities are formed on the first surface, which might impose stress to the polymer electrolyte membrane. For this reason, a $Ry_1$ of exceeding 50 is not preferred. Particularly, from the viewpoint of overcoming the above problems and further ensuring the effect of the present invention, the $Ry_1$ is preferably made to be 20 to 45. This is because, when the $Ry_1$ is 20 or more, the formation of smooth first surface will become easy.

In the present invention, the second surface, which is positioned opposite to the first surface, has a maximum height ($Ry_2$) of 100 to 500. When the second surface has a $Ry_2$ of less than 100, the amount of water that is removed with the reaction gas flowing the gas channel of the separator will be small, decreasing the gas diffusibility. When the second surface has a $Ry_2$ of exceeding 500, asperities will have a length identical or greater than the depth of the groove constituting the gas channel of the separator, which might clog the gas channel. Particularly, from the viewpoint of overcoming the problem and further ensuring the effect of the present invention, preferred range of $Ry_2$ is 200 to 300.

In the gas diffusion layer of the present invention having the above-described structure, because one surface (first surface) of the gas diffusion layer is made smooth and the other surface (second surface) of the same is made rough, the smooth first surface can protect the polymer electrolyte membrane from stress and damage, thus preventing the decrease of cell output resulting from damage of the polymer electrolyte membrane. Likewise, the rough second surface can contribute to the improvement of the anti-flooding characteristics, thus preventing the decrease of cell output resulting from flooding. It is possible to easily and surely realize a fuel cell that can sufficiently prevent the decrease of cell output even when the fuel cell is operated for a long period of time.

Further, the present invention provides a fuel cell comprising: a membrane-electrode assembly including a hydrogen ion conductive polymer electrolyte membrane, a pair of catalyst layers sandwiching the polymer electrolyte membrane and a pair of gas diffusion layers disposed on the outer surfaces of the catalyst layers; and a pair of separators disposed on the outer surfaces of the membrane-electrode assembly, wherein a second surface of the gas diffusion layer which is positioned opposite to a first surface of the gas diffusion layer is made rougher than the first surface, the first surface being to be in contact with the catalyst layer, the first surface has a maximum height $Ry_1$ of 10 to 50 determined by JIS B 0601 surface roughness measurement method, the second surface has a maximum height $Ry_2$ of 100 to 500 determined by JIS B 0601 surface roughness measurement method, and the first surface faces the catalyst layer and the second surface faces the separator.

Because the fuel cell of the present invention employs the gas diffusion layer of the present invention described above, the first surface which is smooth can protect the polymer electrolyte membrane from stress and damage, thus preventing the decrease of cell output resulting from damage of the polymer electrolyte membrane. Likewise, the second surface which is rough can contribute to the improvement of the anti-flooding characteristics, thus preventing the decrease of cell output resulting from flooding. Particularly, even when the fuel cell is operated for a long period of time, the decrease of cell output can be sufficiently prevented.

According to the present invention, it is possible to provide a gas diffusion layer that can be used to easily realize a fuel cell without fail which exhibits excellent anti-flooding characteristics, can protect the polymer electrolyte membrane from damage and can prevent the degradation of cell performance resulting from flooding and damage of the polymer electrolyte membrane. Moreover, according to the present invention, with the use of the aforesaid gas diffusion layer, it is possible to easily and surely obtain a fuel cell that exhibits excellent anti-flooding characteristics, can protect the polymer electrolyte membrane from damage and can sufficiently prevent the decrease of cell output.

DETAILED DESCRIPTION OF THE INVENTION

Preferred embodiments of the present invention will be described below with reference to the accompanying drawings. It is to be understood that the same reference numerals are given to the same or corresponding parts, and some redundant descriptions are omitted.

Figure 1:
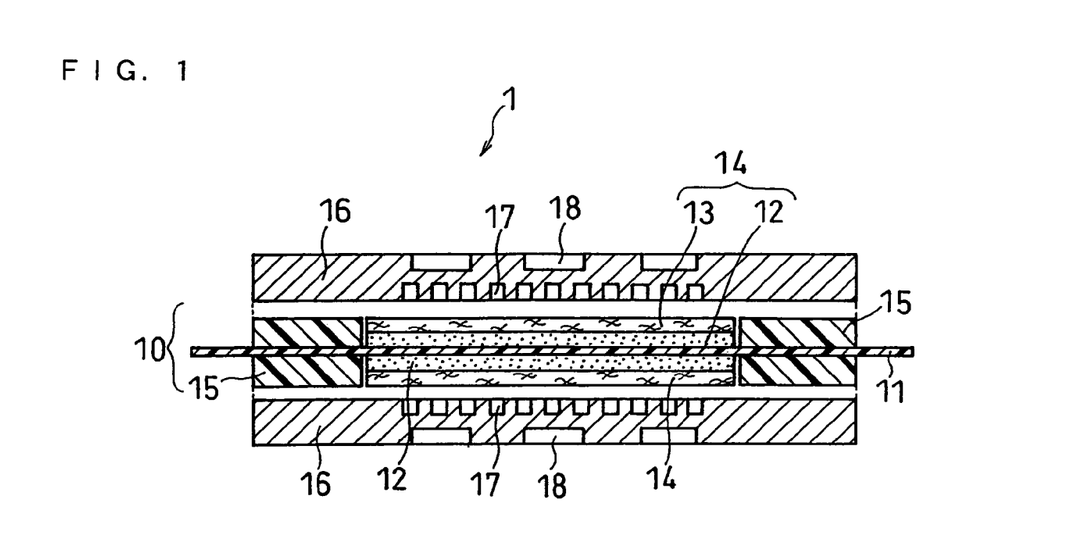
FIG. 1 is a schematic cross sectional view illustrating a basic structure of a unit cell designed to be mounted in a polymer electrolyte fuel cell of the present invention.
Figure 2:
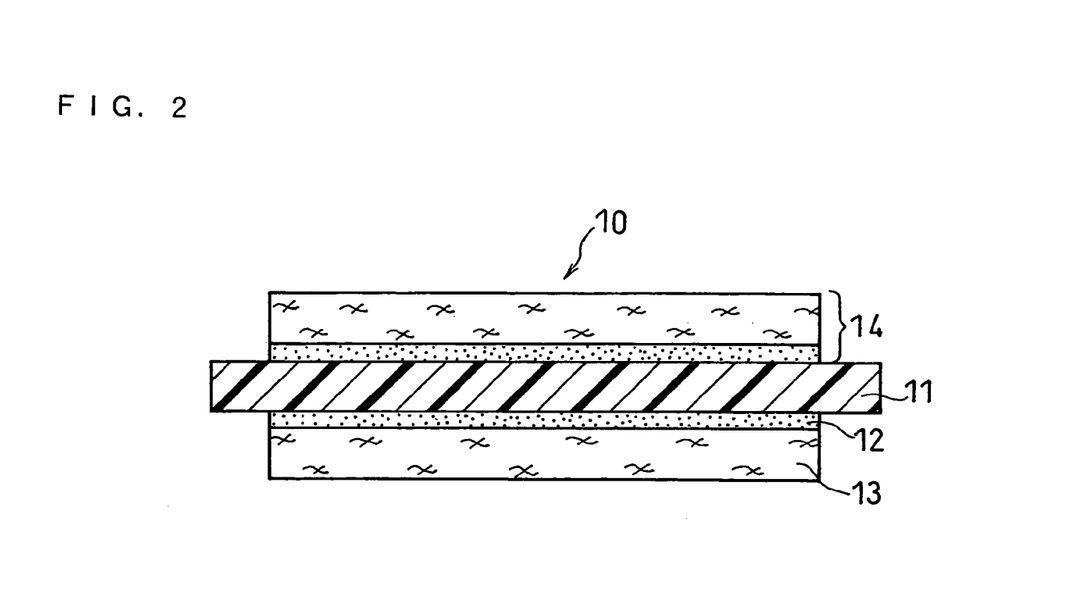
FIG. 2 is a schematic cross sectional view illustrating a basic structure of a membrane-electrode assembly designed to be mounted in the unit cell 1 shown in FIG. 1.

FIG. 1 is a schematic cross sectional view illustrating a basic structure of a unit cell designed to be mounted in a polymer electrolyte fuel cell of the present invention. FIG. 2 is a schematic cross sectional view illustrating a basic structure of a membrane-electrode assembly designed to be mounted in the unit cell 1 shown in FIG. 1. As shown in FIG. 2, in a membrane-electrode assembly 10, on each surface of a hydrogen ion conductive polymer electrolyte membrane 11 capable of selectively transporting cations (hydrogen ions) is formed a catalyst layer 12 containing a hydrogen ion conductive polymer electrolyte and a catalyst body obtained by allowing carbon powders to carry an electrode catalyst (e.g. platinum metal catalyst).

As the polymer electrolyte membrane 11, a polymer electrolyte membrane made of perfluorocarbonsulfonic acid such as Nafion (trade name) available from E.I. Du Pont de Nemours & Co. Inc., USA can be used.

The catalyst layer 12 can be formed by any conventional method in the art with the use of an ink for forming the catalyst layer composed of a dispersion containing conductive carbon particles carrying a noble metal electrode catalyst thereon, a cation (hydrogen ion) conductive polymer electrolyte and a dispersion medium. The catalyst layer 12 can be formed on the surface of the polymer electrolyte membrane 11 in advance, or it can be formed on the surface of a gas diffusion layer 13 in advance.

It should be noted that the term "dispersion containing the polymer electrolyte" used herein includes not only the condition in which the polymer electrolyte is dispersed, but also the condition in which the polymer electrolyte is partly dissolved and the rest is not dissolved but dispersed.

Moreover, it should also be noted that the term "dispersion medium" used herein may be a liquid capable of dispersing the polymer electrolyte used, a liquid capable of dissolving the polymer electrolyte, or a liquid capable of partly dissolving the polymer electrolyte and dispersing the rest.

On the outer surface of the catalyst layer 12 is formed a gas diffusion layer 13 including a porous conductive substrate. The combination of the catalyst layer 12 and the gas diffusion layer 13 constitutes a gas diffusion electrode (anode or cathode) 14. The feature of the present invention lies in the structure of the gas diffusion layer 13, which will be described later.

A membrane-electrode assembly (MEA) 10 is constructed of the polymer electrolyte membrane 11, a pair of the catalyst layers 12 and a pair of the gas diffusion electrodes 14. The MEA 10 can be fabricated by any conventional technique in the art.

In order to effectively use the reaction area of the catalyst layer 12 to yield a high cell output as well as to facilitate the efficiency of assembling process of the MEA 10, in the MEA 10, similar to a conventional MEA, the gas diffusion layer 13 is allowed to have an area one size larger than that of the catalyst layer 12, and the catalyst layer 12 is placed in the center portion of the gas diffusion layer 13 such that the periphery (edge portion) of the gas diffusion layer 13 is positioned outside the catalyst layer 12.

In the case where the catalyst layer 12 is formed on the surface of the polymer electrolyte membrane 11 in advance, the MEA 10 can be produced by first forming the catalyst layer 12 on each surface of the polymer electrolyte membrane 11, sandwiching the polymer electrolyte membrane 11 having the catalyst layers formed thereon with a pair of gas diffusion layers 13, and joining the whole by a conventionally known method.

In the case where the catalyst layer 12 is formed on the surface of the gas diffusion layer 13 in advance, the MEA 10 is produced by first preparing two gas diffusion layers 13 having catalyst layers 12 thereon, which is obtained by forming the catalyst layer 12 on the surface of the gas diffusion layer, and then interposing a polymer electrolyte membrane 11 between the gas diffusion layers 13 such that each catalyst layer 12 faces the polymer electrolyte membrane 11, and finally joining the whole by a conventionally known method.

A unit cell 1 of the present invention includes the MEA 10, gaskets 15 and a pair of separators 16. The gaskets 15 are arranged on the periphery of the gas diffusion electrodes 14 with the polymer electrolyte membrane 11 sandwiched therebetween so as to prevent the supplied fuel gas and the supplied oxidant gas from leaking out and to prevent them from mixing with each other. The gaskets 15 are integrated in advance with the gas diffusion electrodes 14 and the polymer electrolyte membrane 11. In some cases, the combination thereof is referred to as "MEA".

On the outer surfaces of the membrane-electrode assembly 10 are placed a pair of separators 16 for mechanically fixing the membrane-electrode assembly 10. On the surface of the separator 16 to be in contact with the membrane-electrode assembly 10 are formed gas channels 17 for supplying the reaction gas (fuel gas or oxidant gas) to the gas diffusion electrode 14 and for removing a gas containing an electrode reaction product and unreacted reaction gas from the reaction site to the outside of the electrode.

The gas channels 17 can be formed independently of the separator 16. In FIG. 1, however, the gas channels 17 are formed on the surface of the separator 16 by forming grooves.

A single unit cell fabricated by fixing the MEA 10 with a pair of the separators 16 can produce an electromotive force of about 0.7 to 0.8 V at a practical current density of several tens to several hundreds mA/cm$^2$ when the fuel gas is supplied to the gas channel 17 of one of the separators 16 and the oxidant gas is supplied to the gas channel 17 of the other of the separators 16.

Polymer electrolyte fuel cells, however, are usually required to produce a voltage of several to several hundreds volts when used as power sources. For this reason, in practice, the required number of unit cells are connected in series to give a stack (not shown in the drawings) for use.

Although not shown in the drawings, in order to supply a reaction gas to the gas channel 17, there is required a manifold in which a pipe for supplying the reaction gas is branched into a corresponding number of separators 16 used and the branched pipes are directly connected to the channels on the separators 16.

In the present invention, either of an external manifold and an internal manifold can be used.

In order to overcome the above-described conventional problems, the gas diffusion layer 13 of the present invention is a gas diffusion layer for a gas diffusion electrode including at least a catalyst layer containing an electrode catalyst and a gas diffusion layer having electron conductivity and gas diffusibility, wherein the second surface of the gas diffusion layer which is positioned opposite to the first surface of the same is made rougher than the first surface to be in contact with the catalyst layer, and the first surface has a maximum height $Ry_1$ of 10 to 50 determined by JIS B 0601 surface roughness measurement method and the second surface has a maximum height $Ry_2$ of 100 to 500 determined by JIS B 0601 surface roughness measurement method.

The gas diffusion layer 13 of the present invention having the above structure is placed in the unit cell 1 such that the smooth first surface is in contact with the catalyst layer 12 (i.e. the polymer electrolyte membrane 11-side) and that the rough second surface is in contact with the separator 16, whereby it is possible to protect the polymer electrolyte membrane 11 from stress and damage, thus preventing the decrease of cell output resulting from damaged polymer electrolyte membrane 11. Moreover, the asperities of the rough second surface can contribute to the improvement of anti-flooding characteristics, thus preventing the decrease of cell output resulting from flooding. As a result, it is possible to easily realize a fuel cell without fail that can sufficiently prevent the decrease of cell output even when the fuel cell is operated for a long period of time.

In the gas diffusion layer 13 of the present invention, before the gas diffusion layer 13 is incorporated into the unit cell 1, the second surface of the gas diffusion layer 13 to be in contact with the separator 16 should be made rough by forming asperities while maintaining the smoothness of the first surface to be in contact with the polymer electrolyte membrane 11 having catalyst layers 12 thereon.

This is because, considering the damage to the polymer electrolyte membrane 11, it is preferred that the first surface of the gas diffusion layer 13 to be positioned at the polymer electrolyte membrane 11-side be smooth.

The variation of temperature distribution due to the concentration of the reaction sites and the partial generation of produced water are likely to cause uneven distribution or retention of water, leading to flooding in many cases. However, at the interface between the catalyst layer 12 and the gas diffusion layer 13 which is the reaction site, the three-phase interface having gas diffusibility, electron conductivity and hydrogen ion conductivity can be increased and made uniform by making the first surface of the gas diffusion layer 14 smooth, whereby the concentration of the reaction sites can be avoided to prevent flooding.

Meanwhile, by designedly making the second surface of the gas diffusion layer 13 rough to allow the gas diffusion layer 13 to have asperities, the flow of reaction gas within the gas channel 17 of the separator 16 can be changed from laminar flow to turbulent flow, whereby it is possible to obtain the effect of preventing water from being retained within the gas diffusion layer 13 and the effect of expediting the removal of water.

Further, when the first surface of the gas diffusion layer 13 positioned at the catalyst layer 12 side is smooth, the flow of reaction gas, which is changed into turbulent flow by the asperities of the second surface of the gas diffusion layer 13 in contact with the separator 16, reaches the catalyst layer 12 without clogging, which is expected to produce a synergistic effect on the removal of produced water.

As long as the first surface of the gas diffusion layer 13 is made smooth and the second surface of the same is made rough as described above, the gas diffusion layer 13 can be made of any material. For example, the gas diffusion layer 13 can be made of a porous conductive substrate, or it can be made of at least one water repellent conductive layer. When the gas diffusion layer 13 is made of a porous conductive substrate, the porous conductive substrate may be subjected to various treatment steps.

Alternatively, the gas diffusion layer 13 may be made of at least a first layer composed mainly of a porous conductive substrate and a water repellent conductive layer to be interposed between the first layer and the catalyst layer. In this case, the surface of the water repellent conductive layer on the catalyst layer 12 side corresponds to the first surface described above.

Since the gas diffusion layer 13 must have gas permeability, water repellency and conductivity, as the porous conductive substrate, for example, carbon paper, carbon cloth, carbon felt or the like can be used. Particularly, from the viewpoint of exhibiting sufficient water repellency without water repellent treatment, it is preferred to use graphitized carbon paper, graphitized carbon cloth or graphitized carbon felt obtained by baking at a high temperature of not less than 2000° C.

The porous conductive substrate baked at a high temperature has high water repellency even when a water repellent is not added thereto, but such high temperature baking will result in higher cost. For this reason, the gas diffusion layer 13 may be formed by adding a water repellent to a polymer material (e.g. polyacrylonitrile is preferably used) carbonized so as to have a certain level of conductivity.

The porous conductive material is not necessarily made of carbon as long as it has gas permeability, conductivity and water repellency. Examples of the porous conductive material include foam metals composed mainly of iron, foam metals composed mainly of nickel and foam metals composed mainly of iron and nickel.

Generally speaking, among the materials for the porous conductive substrate, carbon cloth has the most noticeable asperities on the surface thereof, followed by carbon felt. Carbon paper has the least noticeable asperities on the surface thereof. When they are roughly classified, the order thereof in terms of roughness is the order shown above. However, the level of roughness can be changed by the thickness of the carbon fiber, the thickness of the porous conductive substrate, the weight per unit area and the production method.

Although the second surface of the gas diffusion layer 13 to be in contact with the separator 16 (i.e. the surface of the porous conductive substrate described above) inherently has rough asperities, there are various methods to designedly form asperities and any method can be used as long as asperities can be formed.

Because carbon felt and carbon cloth are made of intertwined carbon fibers, it is relatively easy to make asperities. In the case of carbon cloth, the easiest way is to increase the number of filaments. In the case of carbon felt, the easiest way is brushing. Brushing, however, might cause some fibers to detach from the intertwined fibers and thus the separation thereof because carbon fibers themselves are not self-binding. For this reason, it is preferred to apply a binder immediately after the brushing or during the brushing to fix the shape of asperities.

The use of a water repellent binder in this step is advantageous in terms of cost reduction. Typical examples of the material stable in water repellent binder include polytetrafluoroethylene (PTFE), tetrafluoroethylene-hexafluoropropylene copolymer (FEP), tetrafluoroethylene-perfluoroalkoxyethylene copolymer (PFA). The use thereof is preferred.

As for the method for forming the asperities, when commercially available carbon paper is used, it is difficult to make the surface rough by brushing because resin is usually applied to the carbon paper and then baked. Accordingly, it is effective to form asperities on the surface by punching or press molding using a mold having asperities. Needless to say, the conditions therefor are a crucial factor.

As the method for forming asperities during the production of carbon paper, there is a method in which thick carbon fibers are contained in the component materials.

Further, if a broken short fiber is attached, micro short-circuiting might occur. Accordingly, it is also preferred to perform a washing step at the end of the production process particularly when carbon paper is used as the porous conductive substrate and asperities are designedly formed by the processing. Needless to say, the washing step can also be performed when carbon cloth or carbon felt is used.

The water repellent conductive layer constituting the first surface which is formed on one surface of the gas diffusion layer 13 can be formed by applying, onto the porous conductive substrate, a coating (ink) prepared by dispersing carbon powders and a water repellent resin in a dispersion medium, followed by the removal of the dispersion medium.

The carbon powders preferably have as small a particle size as possible. The smaller the particle size, the smoother the resulting coating film (i.e. water repellent conductive layer). In other words, the first surface of the gas diffusion layer 13 can be made smooth. As such, during the preparation of the ink, the materials are preferably thoroughly dispersed. It is also effective to use carbon powders originally having a small mean particle size.

For the preparation of the ink by dispersing carbon powders and a water repellent resin in a dispersion medium, followed by kneading, any conventionally known method can be used. For example, a kneader such as pot mill, ball mill, bead mill, disperser and planetary mixer, or a dispersion mixer such as ultrasonic disperser is first used, and then an optimal dispersing operation should be performed according to the device used.

A stirrer not having a dispersing function, however, is not preferred from the viewpoint of making the first surface of the gas diffusion layer 13 smooth because such stirrer cannot crash multinary carbon particles.

The method for applying the ink on one surface of the porous conductive substrate may be any conventionally known method. There are, for example, applicator method, bar coater method, doctor blade method, screen printing method, gravure printing method, coater application method, spraying method, transfer printing method and inkjet method. With the use of any of them, it is possible to give a smooth water repellent conductive layer, and therefore it is possible to make the first surface of the gas diffusion layer 13 smooth.

However, in the case of bar coater method, screen printing method, gravure printing method and inkjet method, the smoothness of the water repellent conductive layer formed will depend on the viscosity of the ink during application, making it likely to form asperities. For this reason, they tend to require more conditions to be taken into account. Accordingly, it is preferred to select the application method that is not affected by coating such as applicator method, doctor blade method, or coater application method for producing a gas diffusion layer 13 having a smooth first surface.

After the ink is applied onto the substrate as described above, the substrate is dried so as to remove the dispersion medium. Due to the composition of the ink, the type of the dispersion medium and the drying conditions, cracks may be induced in the resulting water repellent conductive layer. Such cracks are not preferred because they can significantly affect the smoothness of the first surface. Particularly when the dispersion medium is transferred quickly, in other words, the removal speed is fast, the carbon constituting the porous conductive substrate will aggregate. For this reason, the dispersion medium for use is preferably one having a high boiling point that requires a longer time for drying. Further, the drying is preferably performed slowly at a low temperature for a long period of time.

Since the cracks as described above occur due to the aggregation of carbon, it is preferred to select a water repellent resin that also serves as the dispersion medium. Further, the composition of the ink (composition ratio) is preferably optimized in terms of cell performance and production.

From the viewpoint of reliability and safety, the water repellent conductive layer preferably has a thickness greater than that of the polymer electrolyte membrane 11. From the viewpoint of cell performance (conductivity), the water repellent conductive layer preferably has a thickness less than that of the polymer electrolyte membrane 11. The thickness of the water repellent conductive layer 11 can be appropriately adjusted according to conditions such as operation conditions, performance and service life that the fuel cell is required to have.

Preferably, the second surface of the gas diffusion layer 13 has an arithmetic mean surface roughness $Ra_2$ of 20 to 500.

In the gas diffusion layer 13 that can be produced in the manner described above, even when a part of the second surface having a maximum height ($Ry_2$) of not less than 100 is arranged only on the outlet side of the gas channel 17, a certain degree of effect can be expected. However, the gas diffusion layer 13 preferably has asperities on the entire surface thereof. For this reason, the arithmetic mean surface roughness ($Ra_2$) of the second surface is preferably 20 or greater. When the asperities has a maximum height ($Ry_2$) of less than 500, the effect of the present invention can be ensured because the asperities can hardly clog the groove that constitutes the gas channel 17.

Moreover, particularly when the groove that constitutes the gas channel 17 of the separator 16 has a constant width and a constant depth, the maximum height ($Ry_2$) of the second surface is preferably gradually increased from the inlet of the gas channel 17 toward the outlet of the same. This is because the rate of flow decreases from the inlet toward the outlet because the supplied reaction gas is consumed.

The arithmetic mean surface roughness $Ra_2$ determined by JIS B 0601 surface roughness measurement method used herein is a value determined according to ISO 4287 surface roughness measurement. Specifically, a reference length is sampled from the roughness curve in the direction of the mean line. In the sampled portion, when the direction of the mean line is represented by the X axis, the direction of longitudinal magnification is represented by the Y axis and the roughness curve is expressed by $y=f(x)$, the arithmetic mean surface roughness $Ra_2$ is calculated by dividing the area surrounded by the mean line and the line expressed by $y=f(x)$ by the reference length. Similarly, the maximum height Ry is obtained by, sampling a reference length from the roughness curve in the direction of the mean line, and measuring a distance between the maximum peak height and the maximum valley depth in the direction of longitudinal magnification in the sampled portion.

The first surface of the gas diffusion layer 13 preferably has an arithmetic mean surface roughness $Ra_1$ of 3 to 6.

When the $Ra_1$ is 3 or greater, the effect of the present invention can be further ensured while the gas permeability is sufficiently maintained. When the $Ra_1$ is less than 6, the effect of the present invention can be further ensured while the gas permeability is sufficiently maintained.

Although the foregoing has been described with respect to an embodiment of the present invention, it is to be understood that the present invention is not limited to the above embodiment. By way of an example, the water repellent treatment of the porous conductive substrate can be done using any conventionally known method.

Moreover, in the foregoing, description was given on the case of using carbon paper, carbon cloth or carbon felt as the porous conductive substrate. However, the porous conductive substrate can be made of, for example, a conductive water repellent sheet containing fluorocarbon resin and carbon black or a conductive water repellent sheet containing fluorocarbon resin, carbon black and carbon short fibers.

Even when a conductive water repellent sheet containing fluorocarbon resin and carbon black or a conductive water repellent sheet containing fluorocarbon resin, carbon black and carbon short fibers is used to form the gas diffusion layer of the present invention, the effect of improving the anti-flooding characteristics and the protection of the polymer electrolyte membrane from stress can be obtained.

The present invention will be described in further detail with reference to examples, but it is to be appreciated that the present invention is not limited thereto.

EXAMPLE 1

In this example, a membrane-electrode assembly (MEA) having the structure shown in FIG. 2 was first fabricated.

Then, a unit cell (polymer electrolyte fuel cell) having the structure shown in FIG. 1 was constructed.

Carbon cloth (GF-20-31E available from Nippon Carbon Co., Ltd.) plainly woven with carbon fibers serving as the porous conductive substrate was immersed in a dispersion of tetrafluoroethylene-hexafluoropropylene copolymer (FEP) (ND-1 available from Daikin Industries, Ltd.). for water repellent treatment. The porous conductive substrate treated for water repellency was dried at 100° C., and then baked at 350° C.

Subsequently, carbon black was added and dispersed in water containing a surfactant (Triton X available from Kanto Kagaku) using a planetary mixer (T. K. HIVIS MIX available from Tokushu Kika Kogyo Co., Ltd.) under a reduced pressure for 5 hours. A polytetrafluoroethylene (PTFE) resin dispersion (D-1 available from Daikin Industries, Ltd.) was added thereto, which was further kneaded for 30 minutes to yield an ink for forming the water repellent conductive layer.

The obtained ink was applied onto one surface of the porous conductive substrate treated for water repellency by spraying method, which was then dried at 80° C. and further baked at 270° C. to form a water repellent conductive layer. Thereby, a gas diffusion layer of the present invention whose smooth first surface was composed of the water repellent conductive layer was formed. The carbon black contained in the ink used here had an average particle size of 5 µm with a maximum particle size of 20 µm.

The roughness of the first and second surfaces of the gas diffusion layer was determined by JIS B 0601 surface roughness measurement method. The first surface had a maximum height ($Ry_1$) of 44.22 and an arithmetic mean surface roughness ($Ra_1$) of 5.41. The second surface had a maximum height ($Ry_2$) of 164.96 and an arithmetic mean surface roughness ($Ra_2$) of 22.99.

Then, a catalyst layer including a platinum-carrying carbon (TEC10K25E available from Tanaka Kikinzoku Kogyo K.K.) and a polymer electrolyte (Nafion solution available from E.I. Du Pont de Nemours & Co. Inc., USA) was formed on each surface of a polymer electrolyte membrane (Nafion 112 available from E.I. Du Pont de Nemours & Co. Inc., USA). On both surfaces of the polymer electrolyte membrane having the catalyst layers thereon, a pair of gas diffusion layers produced above was placed such that each water repellent conductive layer faced each catalyst layer. The whole was bonded using a die heated to 130° C. with the application of a pressure of 10 kg/cm$^2$ for 1 minute to give a membrane-electrode assembly (MEA).

Sealants were arranged on the thus-produced MEA, which was then sandwiched by separators from both surfaces of the MEA. Thereby, a unit cell (polymer electrolyte fuel cell) having the structure shown in FIG. 1 was obtained.

The average particle size and the maximum particle size of the particles contained in the ink was determined by observing a scattered light caused when a laser light was irradiated to the carbon black suspended in a water dispersion by laser diffraction/scattering method.

The surface roughness was measured by a laser displacement meter with a beam diameter of 50 µm. Each sample was randomly measured five times. The maximum and minimum values were removed from the five measured values. The average of the remaining three measured values was referred to as surface roughness.

EXAMPLE 2

In this example also, a membrane-electrode assembly (MEA) having the structure shown in FIG. 2 was first fabricated. Then, a unit cell (polymer electrolyte fuel cell) having the structure shown in FIG. 1 was constructed.

Carbon cloth similar to the one used in EXAMPLE 1 as the porous conductive substrate was subjected to pressing treatment. One surface of the carbon cloth was then lightly rubbed with an industrial brush so as to make the surface fuzzy. The carbon cloth was immersed in a FEP resin dispersion for water repellency. The carbon cloth treated for water repellency was then dried at 100° C. and further baked at 350° C. with the fuzzy surface (second surface) facing upward.

Subsequently, the surfactant, water and carbon black were dispersed using the planetary mixer under a reduced pressure for 3 hours. A PTFE resin dispersion was added thereto, which was further kneaded for 30 minutes to yield an ink for forming the water repellent conductive layer.

The ink was applied, by a doctor blade method, onto the other surface (the second surface positioned opposite to the first surface), which was not brushed, of the porous conductive substrate having been subjected to pressing, brushing and water repellent treatment, followed by drying at 40° C. and baking at 270° C. In the manner described above, a water repellent conductive layer was formed on one surface of the porous conductive substrate. Thereby, a gas diffusion layer of the present invention whose smooth first surface was composed of the water repellent conductive layer was formed.

The carbon black contained in the ink had an average particle size of 6 μm with a maximum particle size of 30 μm.

Similar to EXAMPLE 1, the maximum height and the arithmetic mean surface roughness of the first surface (the surface having the water repellent conductive layer) and the second surface of the obtained gas diffusion layer were determined according to JIS B 0601 surface roughness measurement method. The results are shown in Table 1.

With the use of the gas diffusion layer, a unit cell (polymer electrolyte fuel cell) having the structure shown in FIG. 1 was produced in the same manner as in EXAMPLE 1.

EXAMPLE 3

In this example also, a membrane-electrode assembly (MEA) having the structure shown in FIG. 2 was first fabricated. Then, a unit cell (polymer electrolyte fuel cell) having the structure shown in FIG. 1 was constructed.

Carbon paper (GDL30AA available from SGL Carbon Japan Co., Ltd) serving as the porous conductive substrate was immersed in the PTFE resin dispersion used in the EXAMPLE 1 for water repellent treatment, followed by drying at 100° C. Then, a water repellent conductive layer was formed on one surface of the porous conductive substrate treated for water repellency by the application of the ink in the same manner as in EXAMPLE 1, which was dried at 80° C. and baked at 300° C. Thereby, a gas diffusion layer of the present invention whose smooth first surface was composed of the water repellent conductive layer was formed.

The particles contained in the ink had an average particle size of 3 μm with a maximum particle size of 30 μm.

Similar to EXAMPLE 1, the maximum height and the arithmetic mean surface roughness of the first surface (the surface having the water repellent conductive layer) and the second surface of the obtained gas diffusion layer were determined according to JIS B 0601 surface roughness measurement method. The results are shown in Table 1.

With the use of the gas diffusion layer, a unit cell (polymer electrolyte fuel cell) having the structure shown in FIG. 1 was produced in the same manner as in EXAMPLE 1.

EXAMPLES 4 TO 7

Gas diffusion layers having the maximum height and the arithmetic mean surface roughness shown in Table 1 were produced by changing the materials for the porous conductive substrate, the dispersion used for water treatment and the water repellent conductive layer, and the degree of brushing.

With the use of the obtained gas diffusion layers, unit cells (polymer electrolyte fuel cells) having the structure shown in FIG. 1 were produced in the same manner as in EXAMPLE 1.

COMPARATIVE EXAMPLE 1

A gas diffusion layer was formed in the same manner as in EXAMPLE 2 except that carbon cloth (SCT-NF2-3 available from Showa Denko K.K.) was used as the porous conductive substrate, and that adjustment was made such that the first surface and the second surface had the maximum height and the arithmetic mean surface roughness shown in Table 1. With the use of the obtained gas diffusion layer, a unit cell (polymer electrolyte fuel cell) having the structure shown in FIG. 1 was produced in the same manner as in EXAMPLE 1.

COMPARATIVE EXAMPLE 2

Carbon paper (TGP-H-060 available from Toray Industries. Inc.) serving as the porous conductive substrate for the gas diffusion layer was immersed in the PTFE dispersion for water repellent treatment, followed by drying at 100° C. in the same manner as in EXAMPLE 3. Then, the surfactant, water and carbon black were dispersed using the planetary mixer under a reduced pressure for 3 hours. A PTFE dispersion similar to the one used above was added thereto, which was further kneaded for 30 minutes to yield an ink for forming the water repellent conductive layer.

The obtained ink was applied, by spraying method, onto one surface of the porous conductive substrate treated for water repellency in the same manner described above, followed by drying at 80° C. and baking at 270° C. Thereby, a water repellent conductive layer was formed. The particles contained in the ink had an average particle size of 7 μm with a maximum particle size of 50 μm.

A gas diffusion layer was formed in the same manner as in EXAMPLE 3 except that adjustment was made such that the first surface and the second surface had the maximum height and the arithmetic mean surface roughness shown in Table 1. With the use of the obtained gas diffusion layer, a unit cell (polymer electrolyte fuel cell) having the structure shown in FIG. 1 was produced in the same manner as in EXAMPLE 3.

COMPARATIVE EXAMPLES 3 to 6

Gas diffusion layers having the maximum height and the arithmetic mean surface roughness shown in Table 1 were produced by changing the materials for the porous conductive substrate, the dispersion used for water treatment and the water repellent conductive layer and the degree of brushing.

With the use of the obtained gas diffusion layers, unit cells (polymer electrolyte fuel cells) having the structure shown in FIG. 1 were produced in the same manner as in COMPARATIVE EXAMPLE 1.

[Evaluation Test 1]

Both electrodes of each of the unit cells A to M produced in EXAMPLEs 1 to 4 and COMPARATIVE EXAMPLEs 1 to 6 were short-circuited so as to apply a direct current. Based on the value of the current flowing, the characteristic value

[kΩ·cm$^2$] that exhibits the micro short-circuit resistance was determined. The greater the characteristic value means the higher the micro short-circuit resistance.

Figure 3:
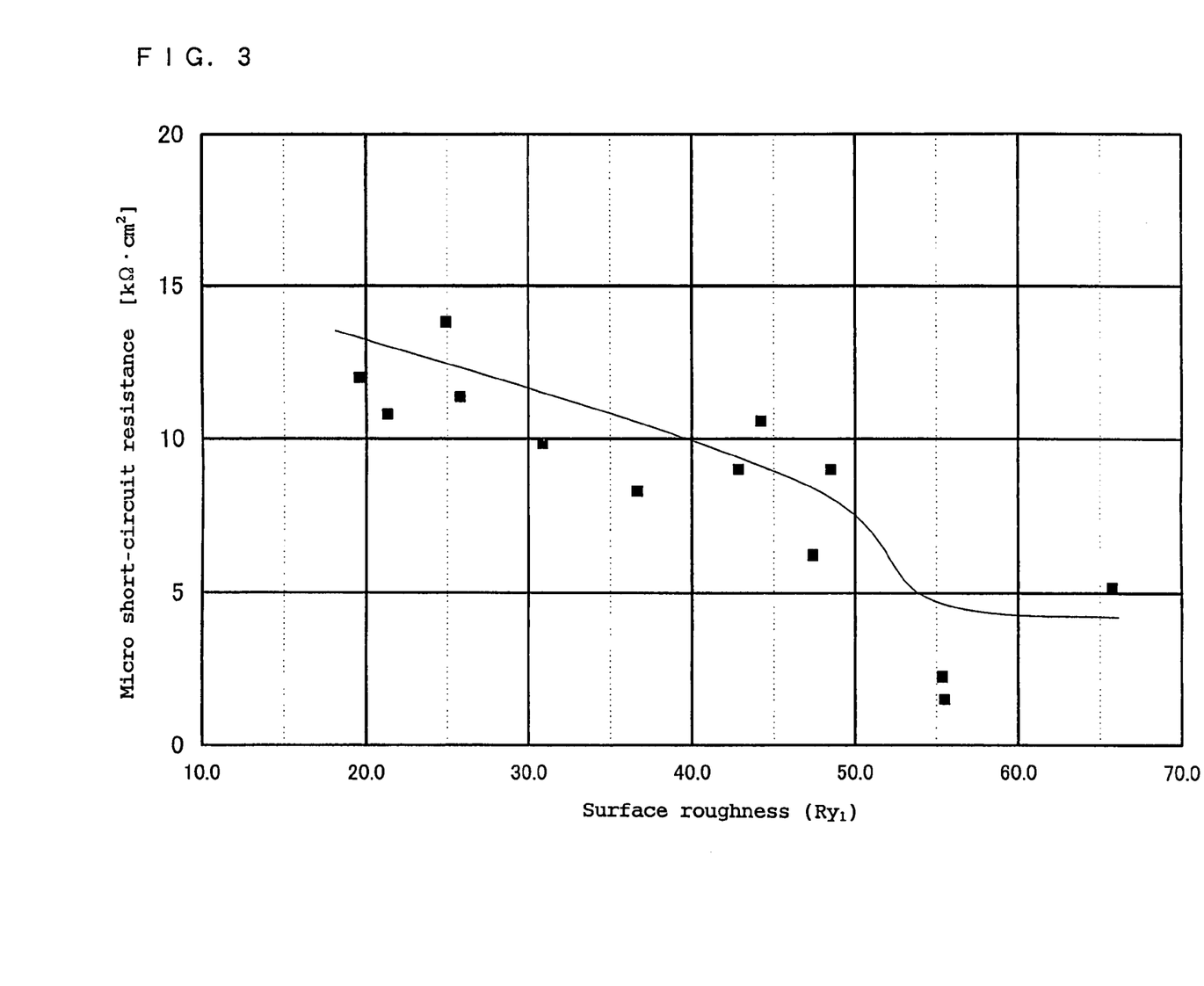
FIG. 3 is a graph showing the correlation between the surface roughness ($Ry_1$) of the smooth first surface of the gas diffusion layer and the micro short-circuit resistance for unit cells A to M.

The results are shown in Table 1 and FIG. 3. FIG. 3 is a graph showing the correlation between the surface roughness (Ry$_1$) of the smooth first surface of the gas diffusion layer and the micro-short circuit resistance for unit cells A to M.

[Evaluation Test 2]

Using the unit cells A to M, a pure hydrogen gas was supplied to the anode through a bubbler at 70° C., and air was supplied to the cathode through a bubbler at 70° C. Under the conditions of a cell temperature of 75° C., a pure hydrogen gas utilization rate of 70% and an air utilization rate of 40%, the unit cells A to M were discharged and the cell voltage was measured. This discharge test was performed by using different current densities, namely, 0 A/cm$^2$, 0.1 A/cm$^2$, 0.3 A/cm$^2$, 0.5 A/cm$^2$, 1.0 A/cm$^2$, 1.2 A/cm$^2$ and 1.5 A/cm$^2$. It was estimated that the greater the cell voltage means the more excellent the anti-flooding characteristics.

Figure 4:
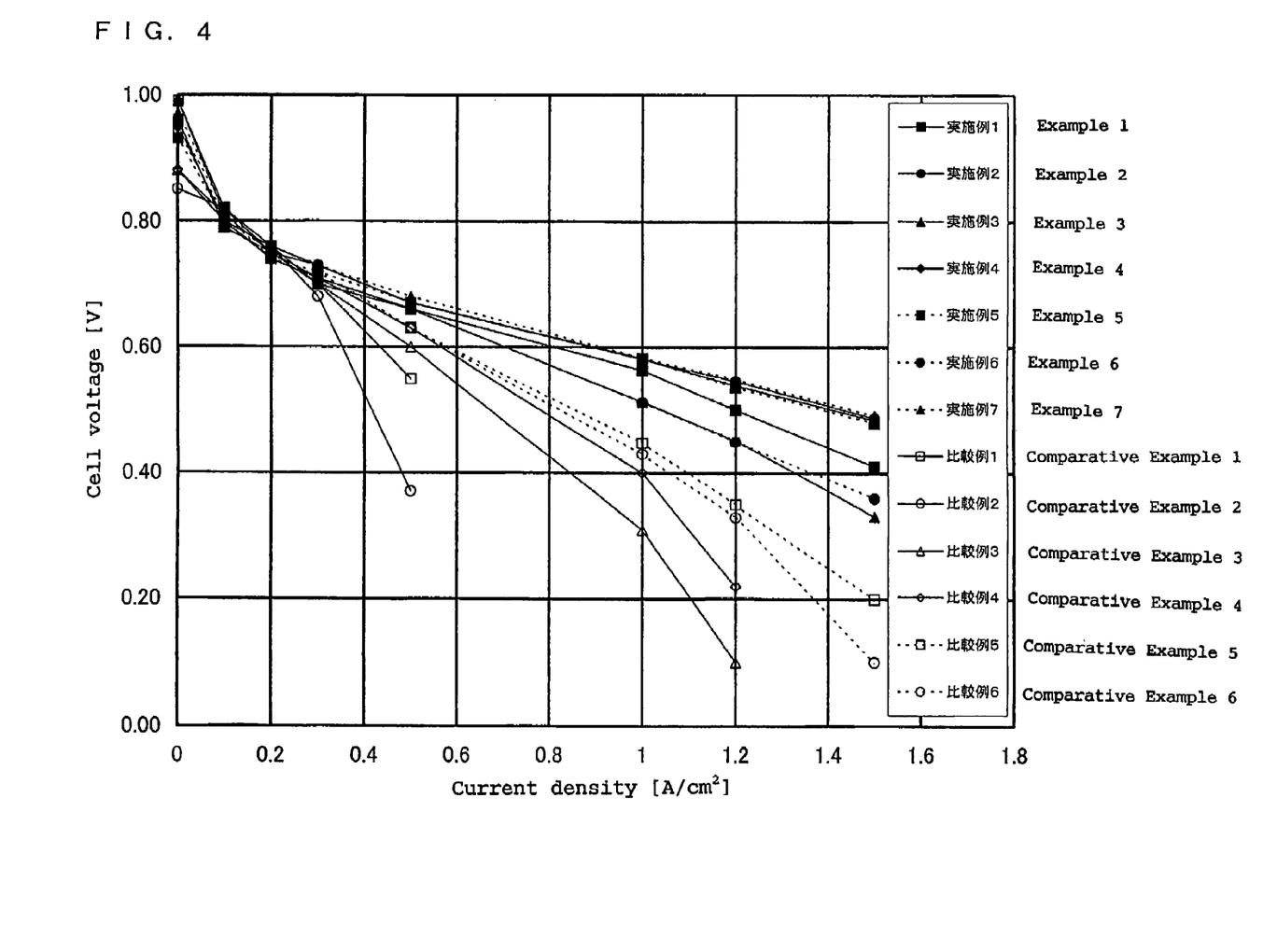
FIG. 4 is a graph showing the discharge characteristics of the unit cells A to M.

The results are shown in Table 1 and FIG. 4. The cells with a dash "–" in Table 1 indicate that the measurement was impossible due to voltage decrease. FIG. 4 is a graph showing the discharge characteristics of the unit cells A to M as hydrogen-air type fuel cells.

second surface (i.e. the surface in contact with the separator) of the gas diffusion layer is made rough, whereby the flow of reaction gas in the gas channel can be changed to turbulent flow to allow the reaction gas to flow easily within the gas diffusion layer, resulting in improved water drainage capability. As a result, a stable gas diffusion layer having excellent anti-flooding characteristics can be obtained. This gas diffusion layer is highly effective particularly in the operation of high current density range that requires transferring of a large amount of water such as high humidity operation and high current density operation.

According to the present invention, by optimizing the surface shape of a gas diffusion layer, it is possible to improve the micro short-circuit resistance and the anti-flooding characteristics, thereby providing a highly reliable fuel cell with excellent discharge characteristics. The fuel cell obtained according to the present invention is suitable for use in automobiles and cogeneration systems.

The invention claimed is:

1. A gas diffusion device for a gas diffusion electrode, comprising:

a catalyst layer containing an electrode catalyst; and

TABLE 1

|  | First surface | | Second surface | | Micro short-circuit resistance | Anti-flooding characteristics Current density [A/cm$^2$] | | | | | | | |
| --- | --- | --- | --- | --- | --- | --- | --- | --- | --- | --- | --- | --- | --- |
|  | Ry$_1$ | Ra$_1$ | Ry$_2$ | Ra$_2$ | kΩ·cm$^2$ | 0 | 0.1 | 0.2 | 0.3 | 0.5 | 1 | 1.2 | 1.5 |
| Example 1 | 44.22 | 5.41 | 164.96 | 22.99 | 10.57 | 0.96 | 0.79 | 0.75 | 0.71 | 0.66 | 0.564 | 0.501 | 0.411 |
| Example 2 | 30.86 | 3.93 | 498.97 | 29.71 | 9.85 | 0.95 | 0.8 | 0.76 | 0.73 | 0.67 | 0.581 | 0.547 | 0.488 |
| Example 3 | 24.92 | 3.47 | 105.41 | 20.57 | 13.82 | 0.99 | 0.82 | 0.75 | 0.7 | 0.66 | 0.514 | 0.452 | 0.332 |
| Example 4 | 21.31 | 3.2 | 481.52 | 32.13 | 10.80 | 0.99 | 0.81 | 0.75 | 0.73 | 0.67 | 0.582 | 0.54 | 0.485 |
| Example 5 | 48.5 | 6.56 | 491.73 | 37.84 | 9.00 | 0.93 | 0.8 | 0.74 | 0.72 | 0.67 | 0.582 | 0.537 | 0.48 |
| Example 6 | 42.83 | 3.94 | 101.47 | 20.27 | 9.00 | 0.95 | 0.82 | 0.75 | 0.7 | 0.66 | 0.513 | 0.45 | 0.36 |
| Example 7 | 25.79 | 4.06 | 255.15 | 21.21 | 11.37 | 0.97 | 0.82 | 0.76 | 0.73 | 0.68 | 0.583 | 0.55 | 0.492 |
| Comp. Ex. 1 | 47.41 | 4.29 | 82.71 | 17.61 | 6.23 | 0.99 | 0.82 | 0.76 | 0.7 | 0.55 | — | — | — |
| Comp. Ex. 2 | 65.75 | 8.21 | 58.27 | 8.23 | 5.18 | 0.85 | 0.82 | 0.76 | 0.68 | 0.37 | — | — | — |
| Comp. Ex. 3 | 55.38 | 5.23 | 110.74 | 5.23 | 2.25 | 0.88 | 0.81 | 0.75 | 0.7 | 0.6 | 0.31 | 0.1 | — |
| Comp. Ex. 4 | 55.51 | 6.38 | 451.33 | 6.38 | 1.50 | 0.88 | 0.8 | 0.74 | 0.71 | 0.63 | 0.4 | 0.22 | — |
| Comp. Ex. 5 | 19.58 | 2.68 | 503.21 | 2.68 | 12.00 | 0.99 | 0.82 | 0.74 | 0.72 | 0.63 | 0.448 | 0.35 | 0.2 |
| Comp. Ex. 6 | 36.67 | 4.51 | 508.43 | 4.51 | 8.27 | 0.94 | 0.81 | 0.74 | 0.72 | 0.63 | 0.43 | 0.33 | 0.1 |

As can be seen from FIG. 3, the micro short-circuit resistance fell off at the surface roughness (Ry$_1$) of 50 in the order of the unit cells C, A, B, D and E. The value varied greatly between the unit cells B and D. This indicates that the size of the asperities on the surface affects the insulation between the anode and the cathode with the polymer electrolyte membrane therebetween. It can therefore be concluded that more excellent micro short-circuit resistance is obtained when the first surface (i.e. the surface in contact with the polymer electrolyte membrane) of the gas diffusion layer is smoother.

On the other hand, the voltages at the current density of 0.5 A/cm$^2$ of the unit cells A, B, C, D and E were 0.66 V, 0.68 V, 0.66 V, 0.55 V and 0.37 V, respectively. This indicates that the characteristics in the high current density range can be improved by increasing the size of the asperities of the second surface (i.e. the surface in contact with the separator) of the gas diffusion layer to the extent that the gas channel formed on the separator is not clogged.

When power generation is performed in the high current density range, the amount of water produced at the cathode increases, and therefore higher water drainage capability is required. According to the present invention, however, the a gas diffusion layer having electron conductivity and gas diffusibility, the gas diffusion layer having a first surface and a second surface which is positioned opposite to said first surface, wherein said second surface of said gas diffusion layer is made rougher than said first surface, said first surface being to be in contact with said catalyst layer, said first surface has a maximum height Ry$_1$ of 10 to 50 μm determined by the ISO 4287 surface roughness measurement method, and said second surface has a maximum height Ry$_2$ of 100 to 500 μm determined by the ISO 4287 surface roughness measurement method.

2. The gas diffusion device in accordance with claim 1, wherein the gas diffusion layer comprises a porous conductive substrate.

3. The gas diffusion device in accordance with claim 1, wherein said gas diffusion layer comprises at least one water repellent conductive layer.

4. The gas diffusion device in accordance with claim 1, wherein said gas diffusion layer comprises at least a first layer composed mainly of a porous conductive substrate and a water repellent conductive layer to be interposed between said first layer and said catalyst layer,
wherein the surface of said water repellent conductive layer on the catalyst layer side corresponds to said first surface of the gas diffusion layer.

5. The gas diffusion device in accordance with claim 1, wherein said first surface has a maximum height $Ry_1$ of 20 to 45 μm determined by the ISO 4287 surface roughness measurement method.

6. The gas diffusion device in accordance with claim 1, wherein said second surface has an arithmetic mean surface roughness $Ra_2$ of 20 to 500 μm.

7. A fuel cell comprising:
a membrane-electrode assembly including a hydrogen ion conductive polymer electrolyte membrane;
a pair of catalyst layers sandwiching said polymer electrolyte membrane and a pair of gas diffusion layers disposed on the outer surfaces of said catalyst layers; and
a pair of separators disposed on the outer surfaces of said membrane-electrode assembly,
wherein second surfaces of said pair of gas diffusion layers which are positioned opposite to first surfaces of said pair of gas diffusion layers, respectively, are made rougher than said first surfaces, said first surfaces being to be in contact with said catalyst layer,
said first surfaces have a maximum height $Ry_1$ of 10 to 50 μm determined by the ISO 4287 surface roughness measurement method,
said second surfaces have a maximum height $Ry_2$ of 100 to 500 μm determined by the ISO 4287 surface roughness measurement method, and
said first surfaces face said catalyst layer and said second surfaces face either one of said separator.

8. The fuel cell in accordance with claim 7,
wherein said pair of gas diffusion layers comprise a porous conductive substrate.

9. The fuel cell in accordance with claim 7,
wherein said pair of gas diffusion layers comprise at least one water repellent conductive layer.

10. The fuel cell in accordance with claim 7,
wherein said pair of gas diffusion layers comprise at least a first layer composed mainly of a porous conductive substrate and a water repellent conductive layer to be interposed between said first layer and said catalyst layer, and
the surface of said water repellent conductive layer on the catalyst layer side corresponds to at least one of said first suiface surfaces.

11. The fuel cell in accordance with claim 7,
wherein at least one of said first surfaces has a maximum height $Ry_1$ of 20 to 45 μm determined by the ISO 4287 surface roughness measurement method.

12. The fuel cell in accordance with claim 7, wherein at least one of said second surfaces has an arithmetic mean surface roughness $Ra_2$ of 20 to 500 μm.

* * * * *

UNITED STATES PATENT AND TRADEMARK OFFICE
CERTIFICATE OF CORRECTION

| | |
|---|---|
| PATENT NO. | : 7,560,180 B2 |
| APPLICATION NO. | : 11/062749 |
| DATED | : July 14, 2009 |
| INVENTOR(S) | : Akihiko Yoshida et al. |

It is certified that error appears in the above-identified patent and that said Letters Patent is hereby corrected as shown below:

In Column 18, Line 19 (Claim 10), please delete "suiface".

Signed and Sealed this

Twentieth Day of October, 2009

David J. Kappos
*Director of the United States Patent and Trademark Office*